Dec. 18, 1962 W. SCHMIDT 3,068,642
DRIVE MEANS FOR LAND, WATER AND AIRCRAFT
Filed Nov. 17, 1959 2 Sheets-Sheet 1

INVENTOR.
WILHELM SCHMIDT
BY *Michael S. Striker*
HIS ATTORNEY

Dec. 18, 1962 W. SCHMIDT 3,068,642
DRIVE MEANS FOR LAND, WATER AND AIRCRAFT
Filed Nov. 17, 1959 2 Sheets-Sheet 2

INVENTOR.
WILHELM SCHMIDT
BY *Michael S. Striker*
HIS ATTORNEY

United States Patent Office 3,068,642
Patented Dec. 18, 1962

1

3,068,642
DRIVE MEANS FOR LAND, WATER AND
AIRCRAFT
Wilhelm Schmidt, Dresden, Germany, assignor to Forschungszentrum der Luftfahrtindustries, Dresden, Germany
Filed Nov. 17, 1959, Ser. No. 853,509
10 Claims. (Cl. 60—35.5)

The present invention relates to drive means for land-, water- and aircraft, and more particularly to improvements in a driving arrangement of the type which utilizes a stream or jet of fluid to propel the conveyance in a given direction.

Streams or jets of a fluid medium, e.g. air, in a driving arrangement of the type to which my present invention pertains develop, for example, in the rear of the propeller in an airplane, behind the discharge nozzle of a jet power plant for aircraft, rockets or jet-propelled land- and water-vehicles, and also behind the screw of a ship or other types of watercraft. The propulsion is brought about because of the overspeed of the fluid stream, i.e. due to greater speed of the fluid stream in comparison with the forward speed of the land-, water- or aircraft. As is known, the propulsive force or thrust rises with each increase in the cross-sectional area of the fluid stream and with increasing overspeed, that is, with increasing difference between the speed of the fluid stream and that of the advancing conveyance. However, the efficiency of the driving arrangement improves if the aforementioned difference in speeds is comparatively small, namely, if the speed of the fluid stream approaches the forward speed of the conveyance. To attain a satisfactory degree of efficiency and also a comparatively large propulsive force, it was customary to increase the cross-sectional area of the fluid stream and to reduce the difference between the aforementioned speeds. However, the cross-sectional area of the fluid stream or jet frequently reaches an upper limit which is still below such as is necessary to insure a satisfactory degree of efficiency. For example, the upper limit in the cross-sectional area of the fluid stream is reached prematurely when a watercraft is propelled in shallow water or when a sled is driven in snow by a propeller or other fluid stream or jet generating means. It is also difficult to attain satisfactory efficiency in propeller-driven aircraft because the efficiency drops when the rotational speed of the propeller tips reaches or exceeds the speed of sound. In jet powered aircraft, too, certain technical and constructional difficulties impose upper limits to the dimensioning of cross-sectional areas of the fluid jets; therefore, the efficiency of jet powered aircraft is still well below that of propeller driven airplanes.

Not only the efficiency but the noise, too, depends upon the difference between the speed of the fluid stream and the forward speed of the conveyance. The noise increases with rising over-speed and, consequently, it is again advisable to reduce the difference between the speed of the fluid stream and the forward speed of the conveyance.

An important object of the present invention is to provide an improved driving arrangement of the type in which a fluid stream is utilized for advancing the conveyance, the improvement in the driving arrangement being of such nature that the difference between the speed of the fluid stream and the speed of the conveyance is reduced considerably while the efficiency of the driving arrangement remains unchanged and the cross-sectional area of the fluid stream need not be increased.

A further object of the instant invention is to provide an improved driving arrangement of the above outlined characteristics which is of very simple construction and which may be readily embodied in many land-, water- and aircraft of presently known design.

With the above objects in view, the invention resides in the recognition that the efficiency of a driving arrangement for land-, water- and aircraft of the type utilizing a fluid stream to advance the conveyance may be increased without increasing the cross-sectional area of the fluid stream, and also that the noise of such conveyances may be kept at a permissible level if the so-called Knoller-Betz or Katzmayr effect is utilized. See, for example, "Propulsion of a Flapping and Oscillating Airfoil," NACA Report 567. More particularly, the invention resides in the provision of means for continuously deflecting at least one originally straight fluid stream or jet produced, for example, by the propeller of an aircraft, by the screw of a watercraft, or by the jet power plant of a rocket, a land vehicle or the like, and for alternately guiding the deflected stream or streams against at least two substantially opposed outer sides or surfaces of at least one profiled body, the position of the outer sides against which the deflected stream or streams impinge being such that they are substantially parallel with the direction of propulsion and with the original direction of the respective fluid stream or streams. The deflecting means may consist of a distinct deflecting element or, alternately, a component part of the fluid stream generating and guiding power plant may be modified in such a way as to deflect the originally straight stream or streams of a fluid medium in desired directions. For example, the discharge nozzle of a jet power plant may be cut off at a given angle and may be caused to rotate so as to deflect at least a portion of the fluid stream passing therethrough against selected sides of a unitary or composite profiled body, the latter preferably assuming the shape of a wing, a drop, or a combination of such shapes and being located at the downstream side of stream producing means.

The distinct deflecting element may assume the form of a flap which is swingable about an axis substantially perpendicular to the original direction of the fluid stream, i.e. to the direction of propulsion, or it may assume the form of a rotary element which is then driven by suitable means, e.g. by the propeller of an aircraft or by electric motor means, and is installed in a channel or passage formed by a single tubular body or by a plurality of guide members consisting of flat or curved sheet metal plates or the like. Alternately, the deflecting element may be formed as a rotary tubular member whose discharge end is cut off at an angle so as to deflect the fluid stream passing therethrough in desired directions when the deflecting element performs a rotary movement in the fluid stream.

The novel features which are considered as characteristic of the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

Figure 1:
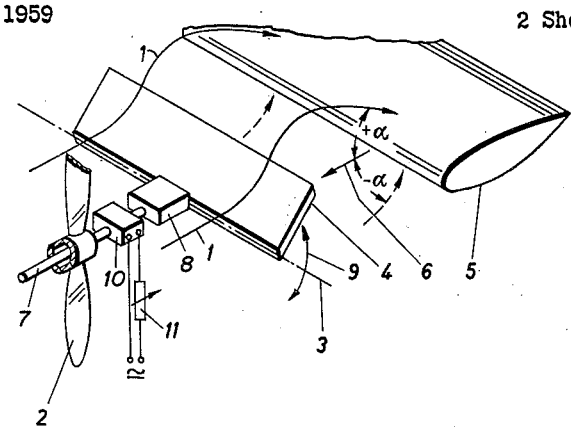
FIG. 1 is schematic perspective view of one embodiment of the driving arrangement according to which a swingable element alternately deflects a fluid stream against two substantially opposed major surfaces of an airfoil- or wing-shaped profiled body.

Referring now in greater detail to the illustrated embodiments, and first to that represented in FIG. 1, the arrows 1 indicate a stream of air or another fluid medium which is produced by a propeller blade 2. The originally straight fluid stream 1 is parallel with the direction of propulsion and is then alternately deflected against the substantially opposed sides or major surfaces of a wing-shaped profiled body 5 by means of a plate-like element 4 which latter is swingable about an axis 3 (shown in broken lines), the axis being substantially perpendicular to the original direction of the fluid stream 1. In FIG. 1, the swingable element 4 deflects the stream produced by the propeller blade 2 against the upper and lower sides of the wing-shaped body 5. The axis of symmetry common to the sides of the profiled body 5 is parallel with the direction in which the conveyance advances and also with the direction of the fluid stream 1 before the latter is deflected by the swingable element 4.

Arrow 6 indicates the direction in which the conveyance advances. The acute angle of incidence α which the deflected fluid stream encloses with the direction of arrow 6 varies between two magnitudes greater and smaller, respectively, than 0 degrees. The deflecting element 4 is actuated by a drive 8 which is operatively connected with the shaft 7 of the propeller blade 2. The construction of the drive 8 is such that it transforms rotary movements of the shaft 7 into reciprocatory or pendulum movements of deflecting element 4, as is indicated by the double arrow 9. The exact construction of this drive forms no part of the present invention. The frequency of swinging or pendulum movements performed by the deflecting element 4 is controlled by a regulator 10, e.g. an electromagnetic coupling, which is operatively connected with the shaft 7 and whose coupling action is controlled by an adjustable resistance 11, the latter enabling the regulator 10 to control and vary the frequency of oscillations performed by the swingable plate-like element 4 in the directions of double arrow 9. The assembly of elements 10, 11 may be replaced by a suitable crank drive or the like (not shown) of such construction as to be capable of oscillating or swinging the deflecting element 4 substantially at right angles to the direction of the fluid stream 1. The crank drive is then combined with suitable means (also not shown as it is analogous with the adjustable resistance 11) for controlling and varying the frequency of oscillations performed by the deflecting element 4.

Figure 2:
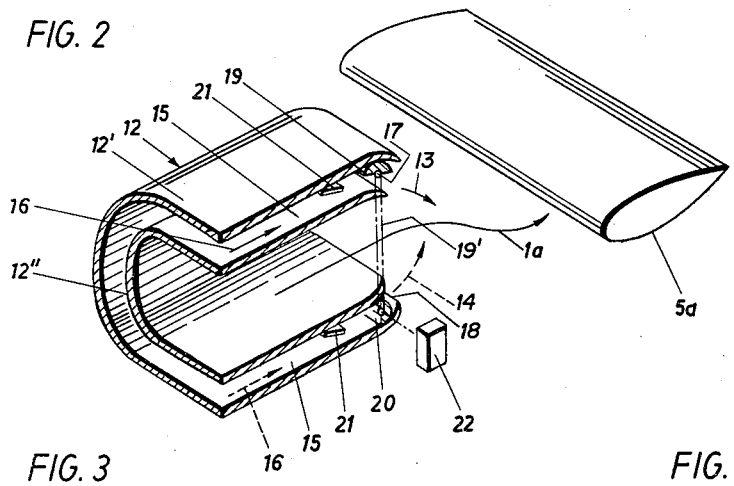
FIG. 2 is a fragmentary perspective view of a modified driving arrangement according to which a fluid stream is directed against the substantially opposed sides of a wing-shaped body with the help of auxiliary fluid stream impulses.

Referring now to FIG. 2, the jet or stream 1a of air, water or another fluid medium is caused to advance through a hollow tubular member 12 before reaching the substantially opposed sides or major surfaces of an airfoil- or wing-shaped profiled body 5a. The stream 1a is alternately directed against the upper and lower side, respectively, of the profiled body 5a by two additional or auxiliary fluid streams or impulses 13, 14. The angle of incidence of auxiliary stream impulse 13 with respect to the original direction of the main fluid stream 1a exceeds 0 degrees, and the angle of incidence enclosed by the directions of streams 1a and 14 is less than 0 degrees.

The hollow tubular body 12 may be formed with twin walls 12', 12" which define an intermediate annular space 15, and a fluid stream 16 is then caused to flow in the annular space 15 toward the discharge end of the hollow member 12. At the latter's discharge end, the walls 12', 12" define two substantially diametrically opposed discharge orifices or ports 17, 18 which are alternately exposed and sealed by two rotatable roller-shaped sealing members 19, 20. The orifice 17 discharges the auxiliary fluid stream 13, and the other orifice 18 discharges the second auxiliary stream or fluid impulse 14. The sealing elements 19, 20 are coupled by any suitable means, e.g. by a coupling 19' (shown schematically in broken lines) or the like. Thus, one of sealing elements or rollers 19, 20 exposes the respective discharge port when the other roller seals the second discharge port, and vice versa.

The annular space 15 contains two adjustable flaps 21 for regulating and controlling the flow of the fluid stream 16. It is also preferred to control the angular speed of rollers 19, 20, e.g. by means of a schematically illustrated adjustable drive 22 or the like. If necessary, the direction of auxiliary fluid streams 13, 14 may be varied, for example, by changing the angular position of the entire hollow tubular body 12, of the discharge end of said body or of the discharge ports 17, 18 therein.

Figure 3:
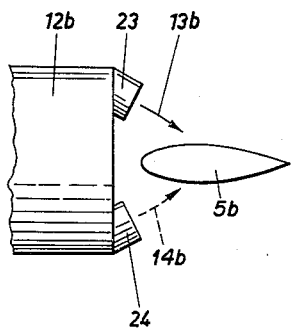
FIG. 3 is schematic side elevational view of a slight modification of the construction shown in FIG. 2, according to which a fluid stream or jet is alternately discharged through a pair of inclined nozzles at the discharge end of a tubular body.

FIG. 3 shows a modification of the construction described in connection with FIG. 2. The substantially opposed sides or major surfaces of an airfoil- or wing-shaped body 5b are impinged upon by fluid streams or jets 13b, 14b discharged alternately by two inclined nozzles 23, 24, respectively. The nozzles are connected to the rear or discharge end of a hollow tubular body 12b. The fluid streams 13b, 14b may be formed by successive deflections of a single fluid stream in the tubular member 12b so as to alternately advance the fluid stream through the nozzles 23, 24, respectively. This is possible because the substantially opposed sides of the wing-shaped profiled body 5b are never subjected to the action of the fluid stream at the same time. The rhythm in which the nozzles 23, 24 open and close to alternatively permit the discharge of auxiliary streams 13b, 14b, respectively, may be regulated or controlled in any suitable way, for example, by a pair of swingable or rotary flaps (not shown) corresponding to members 21 which are illustrated in FIG. 2. Alternatively, each nozzle may be connected with a separate jet power plant, and the ignition of such power plants then occurs in a given sequence so as to alternately discharge streams of a fluid medium through the respective nozzles. In such instances, the improved drive may operate without the aforementioned control flaps or other nozzle-sealing and controlling devices.

Figure 3A:
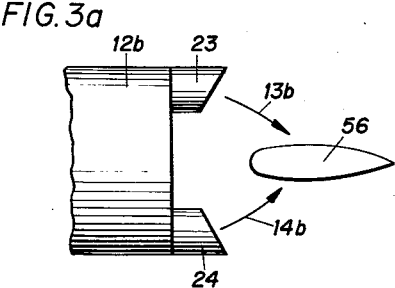
FIG. 3a is a schematic side elevational view of a modified driving arrangement which is similar to the one shown in FIG. 3, excepting that the fluid stream is alternately discharged through a pair of parallel nozzles.

If the jet power plants of nozzles 23, 24 generate fluid streams whose speed equals or exceeds the speed of sound, the axes of said nozzles may remain parallel with the imaginary longitudinal axis of the wing-shaped body 5b if their discharge ends are cut off at a certain angle so that the end faces of both nozzles are inclined relative to and toward the respective major surfaces of profiled body 5b (see FIG. 3a). The arrangement of such nozzles is preferably symmetric. It is also possible to provide more than two discharge nozzles and to replace the profiled body 5b by a drop- or tear-shaped member. Certain sides or zones of a so modified profiled body are then alternately or successively impinged upon by the streams of a fluid medium discharged by the various nozzles, i.e. the entire outer surface of the drop- or tear-shaped profiled body may be exposed to jets or streams of a fluid medium discharged by three, four or more discharge orifices of nozzles whose axes or end faces are suitably inclined with respect thereto. The discharge of fluid streams against selected sides or peripheral zones of the tear-shaped profiled body may occur in series or in any other sequence. In each of such modifications, it is always preferred to provide means for controlling and regulating the inclination, the strength, the velocity and the order or sequence of discharge of individual fluid stream impulses.

Figure 4:
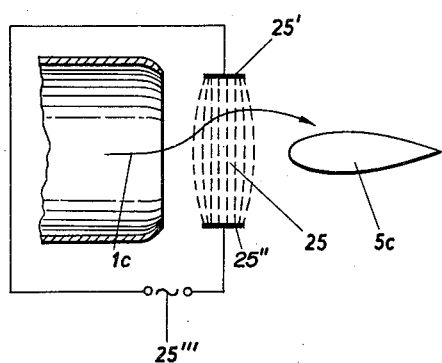
FIG. 4 shows a further modification of the invention according to which the deflection of the fluid stream occurs with the help of an electric or electromagnetic field.

FIG. 4 illustrates schematically an additional modification of the invention which utilizes an electric field for alternately deflecting a single stream or jet 1c of a fluid medium against the substantially opposed sides of the wing-shaped profiled body 5c. Thus, the fluid stream 1c is electrically charged or inoculated with current carriers by the electric field 25 formed between a pair of e.g. plate-like electrodes 25', 25''. The field varies constantly in a given rhythm to cause deflection of the stream 1c against at least two different sides or peripheral zones of the profiled body 5c. Here, too, it is advisable to provid means for varying and controlling th voltage which produces the electric field 25, i.e. to control the magnitude and/or frequency of such voltage. The circuit of electrodes 25', 25'' includes a source of electrical energy 25''' but the means for controlling the voltage and/or the frequency is not shown as it may be of any known design whose exact construction and mounting form no part of the present invention. Alternately, the electric field 25 may be replaced by an electromagnetic field (not shown).

Figure 5:
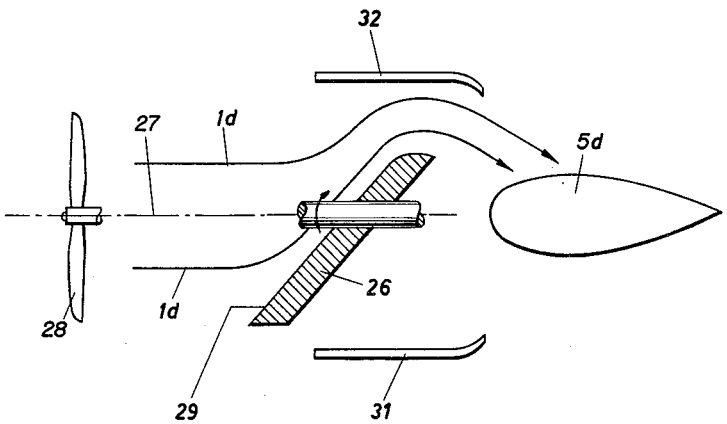
FIG. 5 is schematic side elevational view of a further embodiment of the invention according to which the direction of a fluid stream or jet is varied by means of a rotary deflecting element.

FIG. 5 illustrates a deflecting element 26 which is mounted for rotary movements about the phantom-line axis 27 and is caused to rotate by a non-represented drive of any suitable design. The originally straight fluid stream 1d which is thereupon deflected against two or more substantially opposed sides or distinct surfaces of a profiled body 5d is generated by a propeller blade 28. The fluid stream 1d is deflected by an inclined surface 29 of the rotating element 26 in such a way as to impinge against two or more sides of the wing- or drop-shaped profiled body 5d whereby to produce the Knoller-Betz effect. When the profiled body 5d assumes the shape of an airfoil or wing, the undulate stream 1d, deflected by the element 26, alternately impinges against the opposed major surfaces thereof, e.g. against the upper and lower surfaces, respectively, of the body 5d. It is equally possible to utilize a tear- or drop-shaped profiled body or a profiled body which combines the characteristics of a wing and a drop; such changes in the configuration of the profiled body in no way affect the desired result as will be readily understood upon reading the description of FIG. 6.

It is further possible to combine the deflecting element 26 with the propeller blade 28, e.g. by rigidly mounting the propeller blade 28 on a shaft whose axis coincides with the axis 27 of the element 26, or by moving the parts 26, 28 toward each other so as to form a single integrated or rigidly assembled structure. Though the stationary fluid medium of the surrounding atmosphere or water contributes to the guidance or directional control of the fluid stream 1d, particularly when the conveyance reaches a given forward speed, it is preferred to provide guide members in the form of sheet-metal or like plates 30, 31 which contribute to better utilization of the deflected stream 1d and to better guidance of said stream against selected sides of the profiled body 5d. The guide elements 30, 31 may be flat or they may be suitably bent into forms concentric with the rotational axis 27 of the deflecting element 26.

Figure 6:
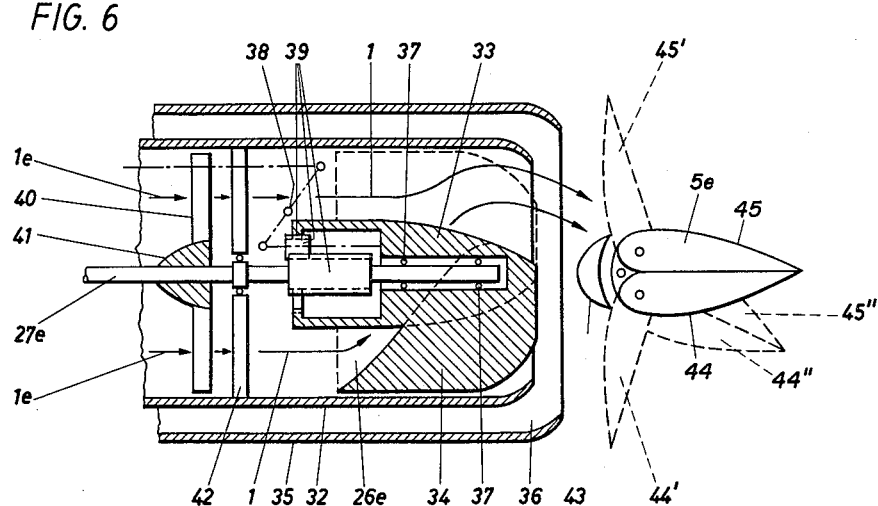
FIG. 6 shows a modification of the construction shown in FIG. 5 in which the fluid stream is produced by a jet power plant.

In FIG. 6, the drive comprises a jet power plant, and the fluid stream or jet 1e passes through a tubular member 32 which constitutes the discharge nozzle of the jet power plant. The interior of the tubular member 32 is of circular cross-sectional contour. The rotary deflecting element 26e is located in the hollow member 32 and serves as a means for deflecting the stream 1e against different zones of the outer surface on a profiled body 5e so as to produce the aforementioned Knoller-Betz effect. It is equally possible to replace a single profiled body 5e (as well as the corresponding profiled bodies 5—5d of FIGS. 1 to 5, respectively) by two or more profiled bodies of suitable configuration. This will be described in greater detail as the description of FIG. 6 proceeds.

The deflecting element 26e may be formed as an axially symmetric drop- or cone-shaped rotary member 33 (shown partly in broken lines) which extends into or merges with a substantially obliquely cut off rotationally or axially symmetric cylinder 34 (shown partly in broken lines) with a rounded rear end. However, the deflecting element 26 may assume many other shapes and it is also possible to mount the suitably modified deflecting element 26e for rotation about an axis which is perpendicular to the flow of the stream 1e. It is further possible to mount the suitably shaped deflecting element in a hollow member of non-circular cross-sectional contour. It has been found, however, that it is very advisable if the deflecting element 26e is mounted in such a way that its shaft or axle 27e remains parallel with and is located in the originally central fluid stream 1e before the latter's deflection, and to select the shape of the element 26e in such a manner that at least one portion thereof assumes the shape of a segment or sector which at least partially seals at least one zone in the interior of the hollow tubular member 32 while at least one other zone of the latter's interior remains unsealed to form a passage for the fluid stream 1e. It is further advisable to form that portion of the deflecting element 26e which faces the incoming stream 1e with an at least slightly inclined surface in such a way that the angle of deflection is greater than 0 degrees but smaller than 90 degrees (see FIG. 6).

The hollow tubular member 32 may be surrounded by a second hollow tubular member 35 whose discharge end extends somewhat beyond the discharge end of the member 32. The tubes 32, 35 form therebetween an annular space 36 which is utilized for conducting a pulsating or continuous fluid stream; the latter may be produced by deflecting a portion of the original main or central fluid stream 1e. When the system utilizes two hollow tubular members, the inner tube 32 may be driven to rotate about its axis and the deflecting element 26e is then rigidly fixed thereto. In such instances, the deflecting element is again formed with at least one at least approximately segment- or sector-shaped portion which seals and exposes at least one zone in the interior of the rotatable member 32. When the latter rotates, it deflects at least one fluid stream against the surfaces or peripheral zones of the profiled body 5e.

Still further, if the tubular member 32 is rotated, its discharge end may be sealed save for an eccentrically located discharge or exit nozzle, in which case the deflecting element 26e and the outer tube 35 may be dispensed with. The discharge orifice of such an exit nozzle then assumes an oval or rectangular contour. If a fluid stream is discharged through the rotating tube 32, and if the speed of such a fluid stream equals or exceeds the speed of sound, it being assumed that the system operates without a distinct deflecting element (26e) and without an outer tube (35), the discharge end of the member 32 is preferably cut off at a certain angle to bring about a deflection of the originally straight stream and to produce the Knoller-Betz effect, as described in full detail hereinabove in connection with FIG. 3.

The deflecting element 26e and/or the tube 32 is preferably movable in the direction of its axis (i.e. the axis of the shaft 27e). It is advisable in such instances to provide an antifriction bearing, e.g. a ball bearing 37, between the shaft 27e and the deflecting element 26e. The axial movements of deflecting element 26e may be brought about by a shifting mechanism here shown (in phantom lines) as a link train 38 or a system of articulately interconnected levers one of which is operatively connected with the element 26e and another of which is shiftable by remote control. The action of the stream deflected by the element 26e may be varied when the latter is shifted in the axial direction of its shaft 27e. The element 26e may be rotated by a drive 39, e.g. a system of planetary gears. If the drive 39 is of the adjustable type, this provides a further possibility of influencing the action of the fluid stream 1e.

Alternately, the means for regulating the speed of planetary gears 39 may be replaced by an electromagnetic coupling (not shown) or by an other device which is capable of controlling and varying the rotational speed of the deflecting element 26e. The electromagnetic coupling may be operated manually through suitable switching means, or in a fully automatic way (e.g. by using a regulator, such as a centrifugal governor or the like). In the latter instance, the influencing and/or stabilizing of the rotational speed of deflecting element 26e occurs without any supervision. Alternately, the effect of the deflected fluid stream passing beyond the tube 32 may be controlled by varying the cross-sectional area at the discharge end of tubular member 32 and/or the tube 35, e.g. by the provision of means for either enlarging or reducing the passage or passages for the deflected fluid stream or streams. For example, the discharge opening of the member 32 and/or 35 may be controlled by overlapping plates (not shown) which may be moved toward (or into) and away from each other.

Alternately, the deflecting element 26e may be driven by coupling its shaft 27e with the drive means which is already provided in the conveyance, e.g. the deflecting element may be coupled with the compressor turbine 40 of the jet power plant. Thus, no separate drive means is then necessary for operating the deflecting element. Of course, if no control of the rotational speed of the element 26e is necessary, the latter may be rigidly connected with the turbine 40. It is equally possible to provide separate drive means for the deflecting element, for example, by combining the latter with an impeller which then operates in a manner similar to that of a wind wheel. Such arrangement is particularly suitable in ram jet engines.

It is often desirable to provide the bearing portion of the compressor turbine 40 with a streamlined extension or attachment 41 to avoid undesirable effects upon the fluid stream 1e. The reference numeral 42 indicates a bearing or mounting element for supporting the shaft 27e of deflecting element 26e. Of course, if necessary, the shaft 27e may be supported at two or more points, i.e. two or more supporting devices 42 may be provided therefor. In such modifications of my drive, the profiled body 5e which is located in the imaginary extension of the undeflected part of fluid stream 1e, i.e. coaxially with the shaft 27e, may assume the shape of an airfoil or the form of a rotary tear-shaped body, as well as a combination of such shapes.

It has been found that it is particularly advantageous to construct the profiled body 5e of several parts, e.g. of parts 43, 44, 45, and to assemble the composite profiled body in such a way that at least two of its component parts are adjustable for the purpose of deflecting, re-routing or otherwise regulating the direction of the fluid stream 1e. In the embodiment illustrated in FIG. 6, the parts 44, 45 of profiled body 5e are adjustable; two of their alternate positions are shown in broken lines at 44', 45' and 44'', 45'', respectively. Such arrangement is comparatively simple as it obviates the provision of very complicated adjusting devices of the type utilized in jet deflecting and reversing systems of presently known design. In such instances, the profiled body 5e, which is necessarily located in the fluid stream, does not offer any resistance to the fluid stream such as could adversely affect the thrust. This is particularly important in many recent types of jet powered aircraft, and such construction is not necessarily limited to uses in connection with a fluid stream which is deflected by a rotary deflecting element, but is equally useful in constructions wherein the deflection occurs by other means.

Without further analysis the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalance of the following claims.

What is claimed as new and desired to be secured by Letters Patent is:

1. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion; and means for alternately directing said fluid stream at a high frequency against the opposed sides of said profiled body in directions enclosing acute angles with the direction of propulsion.

2. A propulsion arrangement for a conveyance of the type which is propelled in a fluid medium by at least one propelling fluid stream moving with respect to the fluid medium, comprising a profiled body located in the fluid stream and having at least two substantially opposed sides extending in the general direction of propulsion; and propulsion means located at the upstream side of said profiled body and producing in the fluid means at least one propelling fluid stream moving with respect to the fluid medium in a direction opposite to the direction of propulsion and having stream portions alternately directed at a high frequency against the opposed sides of said profiled body in directions enclosing acute angles with the direction of propulsion.

3. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion; and means comprising a swingable element located at least partly in said fluid stream intermediate said profiled body and said first mentioned means for deflecting said fluid stream, and actuating means oscillating said swingable element at a high frequency whereby the fluid stream is alternately directed against the opposed sides of said profiled body in directions enclosing acute angles with the direction of propulsion.

4. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the directions of propulsion; a wing shaped profiled body located in the fluid medium at least partly in the path of said fluid stream at the downstream side of said first mentioned means and having two substantially opposed sides extending in the general direction of propulsion; a plate-like deflecting element located between said first mentioned means and said profiled body; said deflecting element having a pivot axis substantially perpendicular to the direction of propulsion; and means oscillating said deflecting element at a high frequency about said axis for alternately deflecting said fluid stream against the opposed sides of said profiled body in directions enclosing acute angles with the direction of propulsion.

5. A propulsion arrangement for a conveyance of the type which is propelled in a fluid medium by at least one propelling fluid stream moving with respect to said fluid medium, comprising means for producing in said fluid medium a straight propelling main fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion; means for producing at least two auxiliary fluid streams, one for each side of said profiled body; and means for alternately directing said auxiliary fluid streams at a high frequency against said main fluid stream and for thereby alternately deflecting said main fluid stream against the opposed sides of said profiled body in directions enclosing acute angles with the direction of propulsion.

6. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion; and a rotary element located at least partly in said fluid stream intermediate said profiled body and said first mentioned means for deflecting said fluid stream at a high frequency whereby the fluid stream is alternately directed against the opposed sides of said profiled body in directions enclosing acute angles with the direction of propulsion.

7. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion; and means comprising a constantly varying electric field for deflecting said fluid stream at a high frequency whereby the fluid stream is alternately directed against the opposed sides of said profiled body in directions enclosing acute angles with the direction of propulsion.

8. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; a profiled body located in the fluid medium at least partly in the path of said fluid stream at the downstream side of said stream producing means and having at least two substantially opposed sides extending in the general direction of propulsion; a tubular member located intermediate said profiled body and said stream producing means for guiding the fluid stream toward said profiled body; and a rotary deflecting element in said tubular member for deflecting said fluid stream at a high frequency whereby the fluid stream is alternately directed against the opposed sides of said profiled body in directions enclosing acute angles with the direction of propulsion, said rotary element forming at least one substantially segmental sealed zone and at least one substantially segmental passage in said tubular member.

9. A propulsion arrangement for a conveyance of the type which is propelled in a fluid medium by at least one propelling fluid stream moving with respect to said fluid medium, comprising means for producing in said fluid medium a first and a second fluid stream moving with respect to the fluid medium in a direction opposite to the direction of propulsion; a profiled body located in the fluid medium at least partly in the path of said first fluid stream at the downstream side of said stream producing means and having at least two substantially opposed sides extending in the general direction of propulsion; a first tubular member located intermediate said profiled body and said stream producing means for guiding the first fluid stream toward said profiled body, said tubular member having a discharge end through which said first fluid stream passes toward said profiled body; a second tubular member surrounding said first tubular member and defining therewith an annular space for the second fluid stream, said second tubular member having a discharge end extending beyond the discharge end of said first tubular member; and means comprising a rotary deflecting element in said first tubular member for deflecting said first fluid stream at a high frequency whereby the first fluid stream is alternately directed against the opposed sides of said profiled body in directions enclosing acute angles with the direction of propulsion, said rotary element forming at least one substantially segmental sealed zone and at least one substantially segmental passage in said first tubular member.

10. A propulsion arrangement for a conveyance of the type which is propelled in a fluid medium by at least one propelling fluid stream moving with respect to said fluid medium, comprising means for producing in said fluid medium at least one propelling fluid stream moving with respect to the fluid medium in a direction opposite to the direction of propulsion; at least one profiled body located in the fluid medium at least partly in the path of said fluid stream at the downstream side of said first mentioned means and having at least two substantially opposed sides extending in the general direction of propulsion, said profiled body consisting of at least two parts at least one of which is movable with respect to the other part; and means for deflecting said fluid stream at a high frequency whereby the fluid stream is alternately directed against the opposed sides of said profiled body in directions enclosing acute angles with the direction of propulsion.

References Cited in the file of this patent

UNITED STATES PATENTS

| | | |
|---|---|---|
| 2,327,744 | Seat | Aug. 24, 1943 |
| 2,557,435 | Imbert | June 19, 1951 |
| 2,599,103 | Goddard | June 3, 1952 |
| 2,758,805 | Graham | Aug. 14, 1956 |
| 2,763,125 | Kadosch et al. | Sept. 18, 1956 |
| 2,825,204 | Kadosch et al. | Mar. 4, 1958 |
| 2,952,123 | Rich | Sept. 13, 1960 |

FOREIGN PATENTS

| | | |
|---|---|---|
| 789,836 | Great Britain | Jan. 29, 1958 |

OTHER REFERENCES

Schmidt and Reichstein, "The Knoller Betz Effect as a Means To Increase The Efficiency of Flapping Wings," Jahrbuch 1942 der deutschen Luftfahrtforschung, pp. 1432–1434. (Copy in application file.)